J. BATES.

HOISTING-MACHINE.

No. 7,236. Reissued July 25, 1876.

Attest:
J. West Wagner
Chas. P. Taylor.

Inventor.
James Bates.
By his Atty.
James L. Norris.

N. PETERS PHOTO-LITHOGRAPHER, WASHINGTON, D. C.

UNITED STATES PATENT OFFICE.

JAMES BATES, OF BALTIMORE, MARYLAND.

IMPROVEMENT IN HOISTING-MACHINES.

Specification forming part of Letters Patent No. 113,836, dated April 18, 1871; reissue No. 7,236, dated July 25, 1876; application filed July 10, 1876.

*To all whom it may concern:*

Be it known that I, JAMES BATES, of Baltimore, in the county of Baltimore and State of Maryland, have invented certain new and useful Improvements in Hoisting-Machines; and I do hereby declare that the following is a full, clear, and exact description thereof, that will enable others skilled in the art to which it appertains to make and use the same, reference being had to the accompanying drawings, and to the letters of reference marked thereon, which form a part of this specification.

This invention relates to certain new and useful improvements in elevators for warehouses, stores, factories, hotels, and other buildings.

The object of my invention is, first, to dispense with the drum or cylinder heretofore used in connection with the rope or chain for elevating the platform; and, second, to provide a safety device which will be automatically thrown into operation and arrest the descent of the platform should the elevating devices be broken or injured, and thus prevent accidents from the falling of said elevator.

My invention consists, first, in the combination, with the carriage of an elevator, of a grooved pulley and a rope or chain passing over the same, and a counterbalance-weight, said counterbalance-weight being directly connected to the rope or chain which suspends the elevating-carriage, motion being imparted to the pulley by means of a system of gearing and a driving-wheel, over which passes an endless rope or chain; second, in the combination, with the driving-pulley, of a friction-lever and weight, adapted to automatically clutch said driving-pulley and arrest its motion, said friction-lever being operated by a supplementary lever connected to a chain or rope extending downward through the flooring of the building; third, in the combination, with the carriage of an elevator, provided with mechanism for arresting the same when the elevator rope or chain is broken, of an elevating-pulley mounted upon a shaft carrying a gear-wheel, meshing with a pinion mounted on the shaft of the driving-wheel, whereby motion is imparted to the elevating-pulley for hoisting or lowering the carriage.

Figure 2:
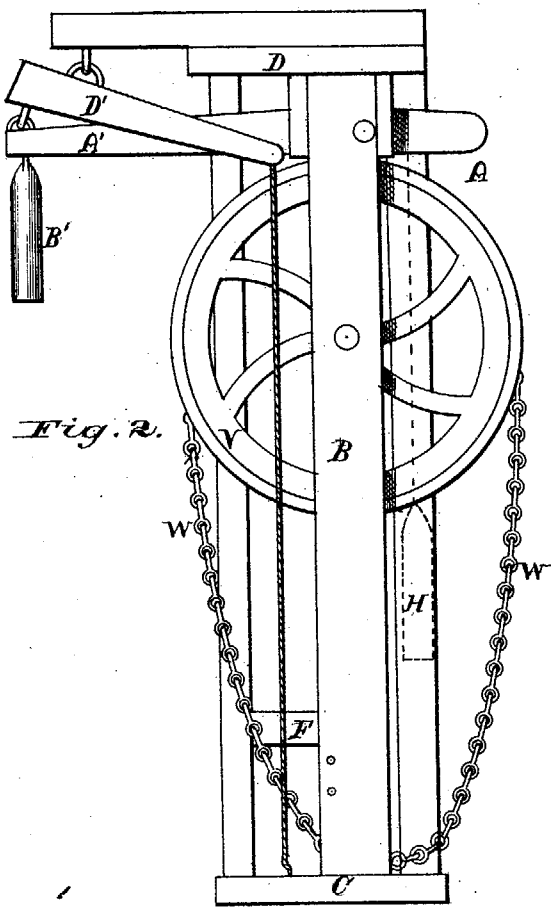
Figure 1:
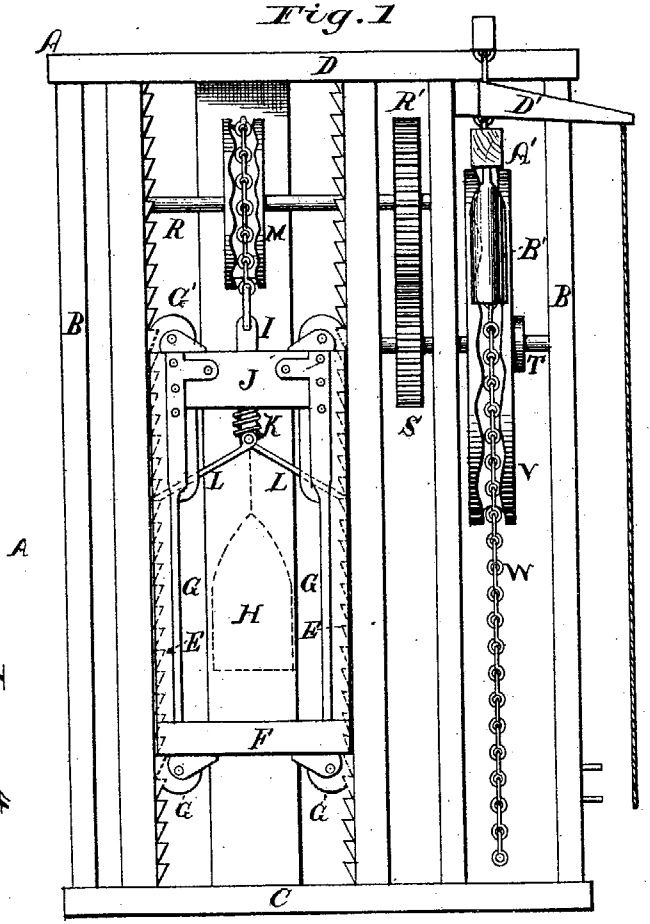

In the drawing, Figure 1 represents a front elevation of my apparatus, and Fig. 2 a side elevation of the same.

The letter A represents a strong framing, consisting of upright posts B B, secured at the bottom to the base C, which may be either the ground flooring of the building, or a suitable base located in any of the lower rooms thereof, and secured at the top by cross-bracings D, or directly to the roof of the building. The said uprights form the guides in which the moving platform travels, and are each provided with a ratchet, E, the object of which will be hereinafter specified.

The letter F represents the elevator-carriage or traveling platform, which consists of a strong base or stage and a frame-work, G, adapted to fit between and travel in the guides formed by the uprights B B. In order that the said frame may travel freely between said uprights or guides, it is provided at each corner with friction-wheels G′, which bear against and travel on said uprights. The said wheels are grooved at their peripheries, and set over and travel on the ratchets E.

The letter I represents a sliding bar extending through the cross-beam J, forming part of the frame-work G, and provided at its lower end with a strong spiral spring, K, the upper end having a bearing against said cross-bar, and the lower end against a shoulder on the sliding rod, or upon a pin or bolt projecting through the same. To the lower end of said rod are pivoted or loosely attached two pawls, L L, which project through the sides of the elevator, the object of which will be hereinafter explained.

The letter M represents a grooved elevating-wheel, over which passes a rope or chain, connected at one end to the sliding bar N, and at the other to the weight O. Said elevating-pulley is mounted on a shaft, R, journaled in the upper part of the frame-work of the apparatus, and having mounted on its outer end a cog-wheel, R′, connecting with a cog-wheel, S, mounted upon a shaft, T, journaled in the uprights B B.

To the outer end of said journal is secured the grooved driving-pulley V, provided with an endless chain or rope, W, extending down through the flooring or the various floorings of the building, by means of which the train of gearing may be put into operation for imparting motion to the elevating pulley or wheel, for the purpose of raising or lowering the carriage or platform.

The letter A′ represents a lever, pivoted so as to be directly over the driving-pulley, and provided with a weight, B′, at its forward end, so that it will bear continually on the periphery of the elevating-pulley, and act as a brake or clamp to hold the same when it is desired to arrest the ascent or descent of the carriage or platform.

The letter D′ represents a supplementary lever, one end of which sets over the lever A′, and is attached by a chain or link to the lever A′, said lever D′ having a chain or rope extending below, by means of which the levers may be operated to relieve the elevating-wheel when it is desired to lower or raise the platform.

The operation of my apparatus is as follows: The carriage or platform being properly loaded, the elevating train of gearing is set in operation by means of the chain or rope depending from the driving-wheel, the clutch-lever being drawn out of contact with the same by means of the supplementary levers and the dependent rope or chain. Should it be required to stop the elevator carriage or platform at any point said rope or chain is released, allowing the clutch-lever to clamp the driving-wheel, and thus stop the train of gearing. The balance-weight not only serves to counterbalance the elevator-carriage, but also to keep the sliding bar elevated and hold the pawls out of their respective racks, and should such balance-weight become detached the sliding rod will be drawn downward by the spiral spring, throwing the pawl into the ratchets, and thus effectively preventing the descent of the elevator.

What I claim, and desire to secure by Letters Patent, is—

1. In combination with the carriage of an elevator, a grooved pulley and rope or chain passing over the same, and a counterbalance-weight, said counterbalance-weight being directly connected to said rope or chain, by which the elevating-carriage is hoisted or lowered, motion being imparted to the elevating-pulley by a system of gearing and a driving-wheel operated by an endless rope or chain.

2. In combination with the elevating-pulley, a friction-lever and weight adapted to automatically clutch the elevating-pulley and arrest the motion of the elevator, said friction-lever being operated by a supplementary lever connected to a chain or rope extending downward through the flooring of the building.

3. In combination with the carriage of an elevator, provided with mechanism for arresting the same when the elevating-rope is broken, an elevating-pulley mounted upon a shaft carrying a gear-wheel, meshing with a pinion mounted on the shaft of the driving-wheel, the whole arranged to operate as described.

In testimony that I claim the foregoing I have hereunto set my hand this 2d day of May, 1876.

JAS. BATES.

Witnesses:
JOS. L. COOMBS,
A. H. NORRIS.